June 13, 1944.	J. M. TYRNER	2,351,083
ELECTRIC ARC WELDING
Filed Dec. 6, 1941	4 Sheets-Sheet 1

INVENTOR
JOSEPH M. TYRNER
BY
ATTORNEY

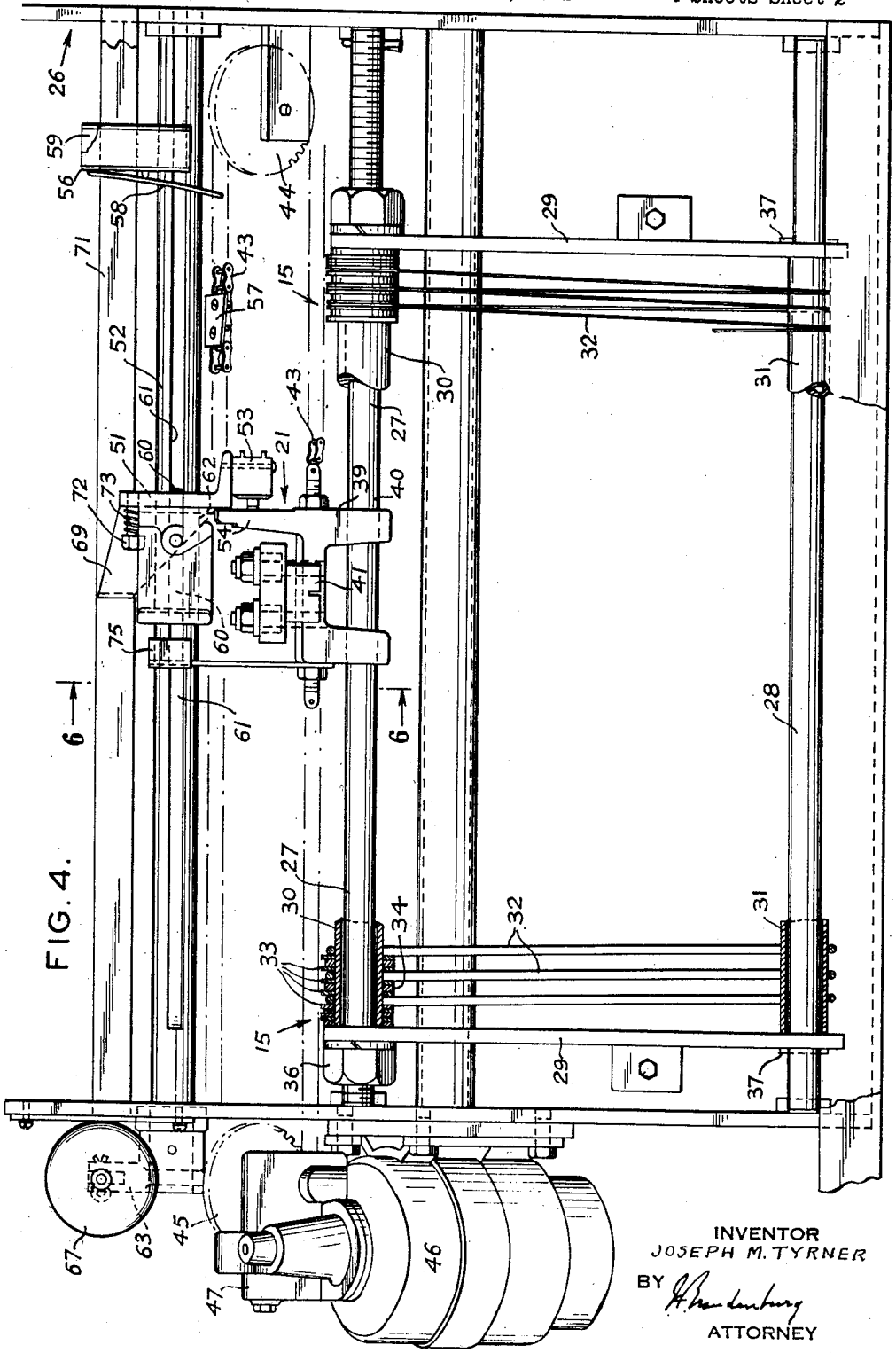

June 13, 1944.    J. M. TYRNER    2,351,083
ELECTRIC ARC WELDING
Filed Dec. 6, 1941    4 Sheets-Sheet 3

INVENTOR
JOSEPH M. TYRNER
BY
ATTORNEY

June 13, 1944.   J. M. TYRNER   2,351,083
ELECTRIC ARC WELDING
Filed Dec. 6, 1941   4 Sheets-Sheet 4
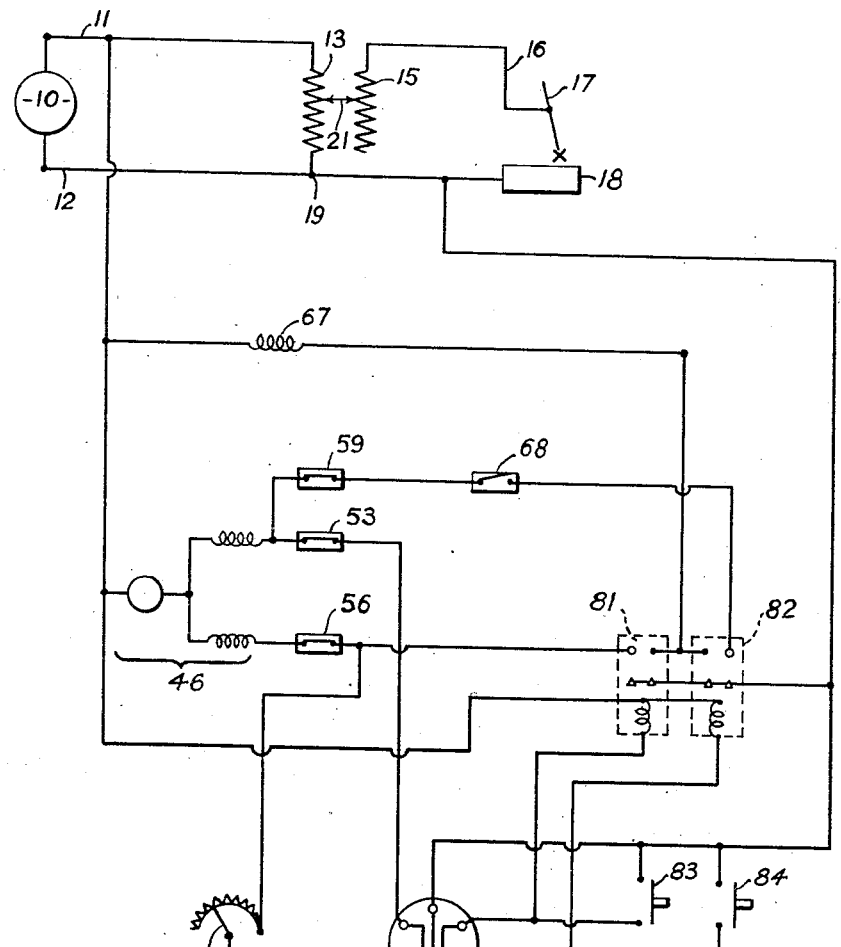
FIG. 7.
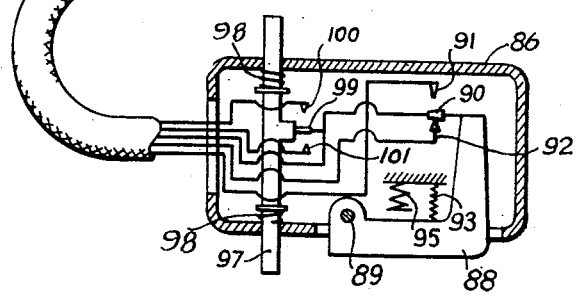
INVENTOR
JOSEPH M. TYRNER
BY
ATTORNEY Patented June 13, 1944

2,351,083

UNITED STATES PATENT OFFICE 2,351,083

ELECTRIC ARC WELDING

Joseph M. Tyrner, Englewood, N. J., assignor to Air Reduction Company, Incorporated, New York, N. Y., a corporation of New York Application December 6, 1941, Serial No. 421,905

11 Claims. (Cl. 315—299)

This invention relates to method and apparatus for electric arc welding without an arc crater at the end of the weld.

The well known "crater" at the end of an arc welded bead not only spoils the appearance of the bead, but for various reasons affects the strength of the joint and is definitely detrimental. It is not sufficient to fill the crater; the procedure of welding has to be changed to eliminate the conditions that cause the crater.

It is known in the art to eliminate these conditions by slowly reducing the heat and voltage of the current source until the arc fades. This has been accomplished in the prior art by a slow and gradual reduction in the excitation of the generator. This expedient is limited to direct current generators, and since a reduction of the field current affects different generator systems in different ways, it does not work equally well on all generators.

It is an object of this invention to provide an improved method and apparatus for causing a welding arc to fade in a manner that eliminates the formation of arc craters, and to attain this result without interfering with the current source. Experience has shown that it is not only necessary to diminish the heat of the arc, but that the open circuit voltage and the corresponding short circuit current at the arc must also diminish at the same time. The accomplishment of this result without interfering with the current source has the important advantage that more than one welder can receive power from the same machine.

In the rapid expansion of the airplane industry under the national defense program, there has been a shortage of arc welding equipment. Available generators could be converted into constant potential current sources with sufficient capacity to supply two or more welders, but on account of the methods of crater elimination employed, only one welder has been able to work from each generator.

With this invention a variable-resistance arc or load circuit is connected in parallel with a variable resistance element, across the power line from the generator. By varying the resistance of the arc circuit and resistance element in a definite relation the arc is caused to fade under conditions that eliminate the crater at the end of the bead. In general, the variable resistance in parallel with the arc circuit and the resistance in series with the arc circuit are adjusted so that the voltage across the arc is less than the voltage drop across that portion of the variable resistance which is arranged in parallel with the arc circuit. One important advantage of this arrangement is that when this adjustment is made the open circuit voltage available at the arc electrode is reduced to some extent which reduces the tendency of the arc to become reignited immediately after the welding circuit is interrupted, but this open circuit voltage is not so low as to require a substantial readjustment of the circuit in order to provide adequate electrode voltage for commencing the next welding operation. Another important advantage of this invention is that after the adjustment has been made for the purpose of avoiding the arc crater, the short circuit current is substantially less than it would be if the electrode voltage were not reduced to an extent greater than the reduction in the voltage drop across that portion of the variable resistance in parallel with the arc circuit.

One feature of the invention relates to novel apparatus by which the resistance and variations in the connections are controlled at will by the welder. Other features relate to automatic stopping, speed control, and adjustment of the apparatus.

This invention can be used with constant potential or drooping potential generators, and with either direct or alternating-current sources of welding current. The apparatus of this invention can be connected in one or more circuits supplied by a single generator or other current source and a number of welders can work independently of one another on the different circuits. An airplane factory with its production limited by an insufficient number of generators, where only one welder can work from each generator, may have ample arc welding capacity by using this invention and supplying more welders from a single generator.

Other objects, features, and advantages of the invention will appear or be pointed out as the specification proceeds.

In the accompanying drawings, forming part hereof:

Fig. 4 is a side view of the apparatus shown in Fig. 3, mostly in elevation but with some parts shown in section.

Fig. 7 is a wiring diagram for the machine shown in the other views.

Figure 1:
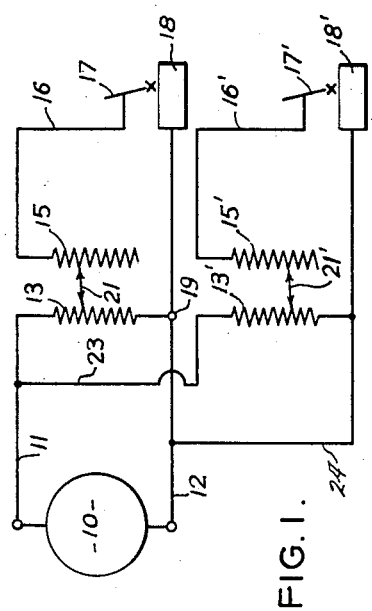
Fig. 1 is a wiring diagram showing control apparatus of this invention applied to two separate welding circuits that are supplied from a common generator.

Fig. 1 shows a generator 10 that is representative of a source of welding current. Conductors 11, 12 comprise the power line from the current source. A resistance element 13 is connected across the power line 11, 12.

A load or arc circuit includes a rheostat 15 connected by a conductor 16 with an electrode holder 17. The arc discharges between the work 18 and an electrode in the holder 17. The work 18 is connected with one side of the power line 11, 12 and to one end of the resistance element 13 at 19.

A brush carriage 21 has one brush that moves along a row of contacts of the resistance element 13, and another brush that moves along a row of contacts of the rheostat 15. These brushes are electrically connected so that they complete a circuit between the resistance element 13 and the rheostat 15. From the circuit shown it is evident that the portion of the resistance element 13 above the brush carriage 21 is in series with the arc circuit whereas the lower portion of this resistance element 13 is in parallel with the arc circuit.

As the brush carriage 21 moves downward in Fig. 1, the portion of the resistance element 13 in series with the arc circuit, and the resistance of the rheostat 15 are both increased; and the proportion of the resistance element 13 in parallel with the arc circuit is decreased. If the resistance of the upper portion of the resistance element 13 is equal to, and varies as, the resistance of the rheostat 15, then the volt-ampere curve for the arc circuit is $$I = \frac{1}{R} \frac{1}{x(2-x)} (E(1-x) - e)$$

Where $I$ and $e$ are the current and voltage, respectively, at the arc circuit $R$ is the resistance of the full length of the resistance element 13

$E$ is the voltage across the power line 11, 12 and $x$ is the percentage of the full length of the resistance element 13 that is above the brush carriage 21.

The open circuit voltage of the arc circuit is $$e_{ox} = E(1-x)$$

The short circuit current is $$I_{shx} = \frac{E}{R} \frac{1}{x} \frac{1-x}{2-x}$$

Figure 2:
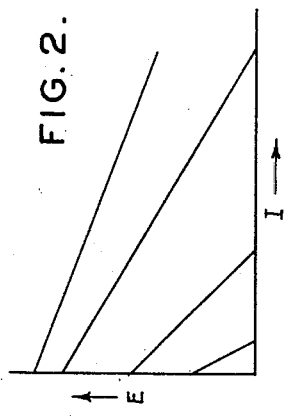
Fig. 2 is a volt-ampere graph illustrating the operation of the invention.

Fig. 2 shows the volt ampere curves for the circuit shown in Fig. 1. Experience shows that while these curves are straight line relations in contrast to the drooping curves obtained with a variation in the excitation of a generator field, a circuit having the characteristics shown in Fig. 2 obtains equally effective crater elimination as with a variation in generator field excitation. Each curve in Fig. 2 shows the voltage current characteristic of the welding circuit for some adjusted position of the control apparatus and it will be noted that as each adjustment is made to a lower curve the open circuit voltage at the electrode is reduced and the short circuit current is also reduced to a substantial extent; and between these extremes, the current in the arc circuit for any existing value of arc resistance is reduced more than it would be if the only adjustment made were a change in the variable resistance to provide the lower open circuit voltage at the arc.

In contrast to the welding equipment in which generator excitation is changed to control the fading of the arc, the movement of the brush carriage 21 (Fig. 1) to control the arc at the electrode holder 17 does not change the voltage of the power line 11, 12. A second resistance element 13' can be connected across the power line 11, 12 by conductors 23, 24, and a second arc welding circuit supplied by the same generator 10. Corresponding parts of the second arc circuit are indicated by the same reference characters as in the first arc circuit but with a prime appended. Still other welding circuits can be connected with the generator 10, if the generator is of sufficient capacity to supply the additional circuits with safety.

The control apparatus shown in Figs. 3–7 includes a frame 26 to which various other elements are connected to make a unit structure. The resistance elements 13 and 15 are of the same construction and a description of one of them is therefore sufficient. This construction is best shown in Fig. 4.

A bolt 27 and rod 28 are held in parallel, spaced relation by end plates 29. The bolt 27 and rod 28 are covered, between the end plates 29, with insulating sleeves 30 and 31, respectively. These sleeves may be mica tubing. A resistance wire 32 is clamped between square, copper washers 33 on the insulating sleeve 30. The wire 32 passes down around the insulating sleeve 31, then upward again between another pair of square, copper, clamping washers 33. Each pair of clamping washers 33 is insulated from the adjacent pair with an insulating washer 34, which may be made of mica. In similar manner the resistance wire 32 is wound around the sleeves 30, 31 throughout substantially the full length of the sleeves, and the top surfaces of the square washers 33 comprise the contact points of the resistance element over which a brush moves.

Since the wire 32 carries much more current when the resistance in the circuit is low than it does after the brush has moved along the resistance element and raised the resistance, the wire 32 is made as a composite wire by connecting successive lengths together end to end with each successive length of smaller cross-section than the preceding length. When very heavy current is to be carried by one end of the resistance unit, a double wire can be used at that end, that is, two or more lengths of wire connected in parallel. A nut 36 on the end of the bolt 27 clamps the plates 29, washers 33, 34, and the turns of the wire 32 into a compact unit. At their lower ends, the side plates 29 are held by cotter pins 37 that pass through the rod 28.

Figure 6:
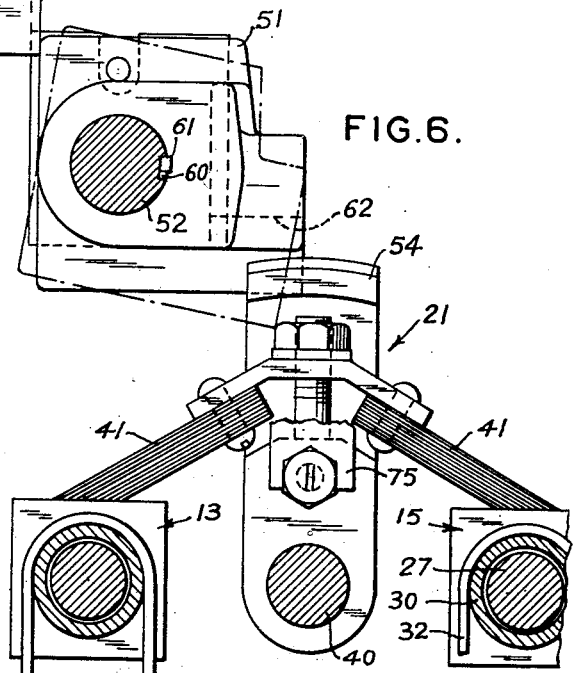
Fig. 6 is an enlarged sectional view taken on the line 6—6 of Fig. 4.

The brush carriage 21 slides on a rod 40 as a guide. The guide rod 40 extends parallel to the rows of contacts at the tops of the resistance elements and is located midway between these resistance elements 13, 15, as shown in Fig. 6. Laminated, spring copper brushes 41 are attached to the carriage 21 and extend from opposite sides of the carriage into contact with the resistance elements 13, 15. The brushes 41 prevent the carriage from overturning on its single center guide rod 40.

Figure 5:
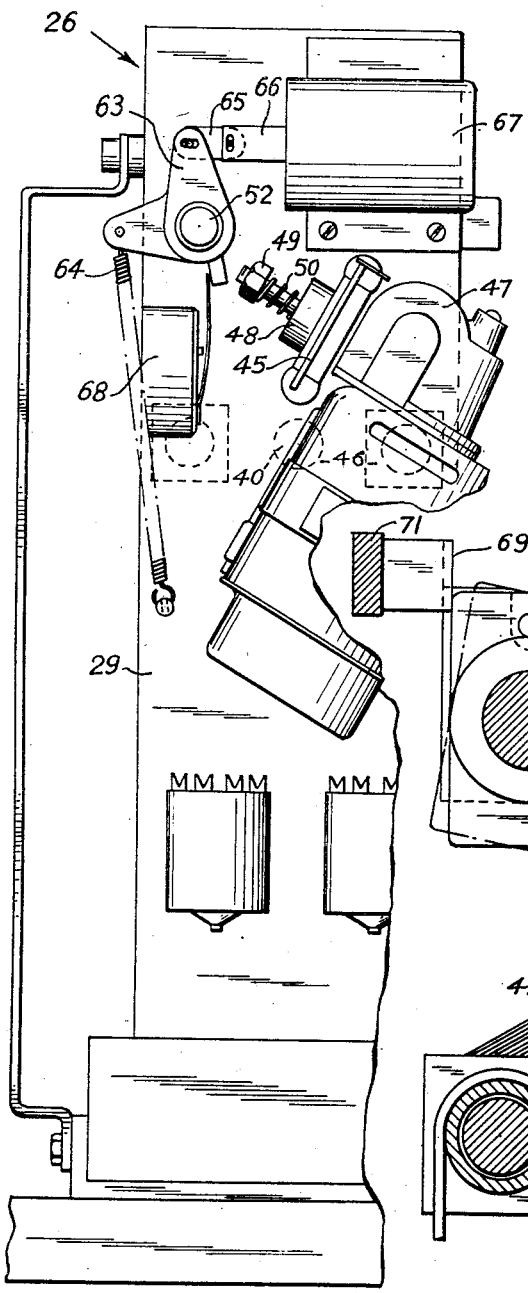
Fig. 5 is an end elevation of the apparatus shown in Figs. 3 and 4.

The brush carriage 21 is connected with the opposite ends of a chain 43 that passes around sprockets 44 and 45 supported from the frame 26 on canted axles. The sprocket 44 is an idler, but the sprocket 45 is driven by an electric motor 46 through reduction gearing 47 and a friction clutch 48 (Fig. 5). The detailed construction of the friction clutch is not important, and for purposes of this invention it is sufficient to understand that the friction clutch 48 slips when the brush carriage comes against a stop and the electric motor 46 still has considerable momentum. In the illustrated embodiment of the invention, the friction of the clutch 48 can be controlled by adjusting a unit 49 that regulates the tension on a clutch-loading spring 50.

Referring again to Fig. 4, a second carriage 51 slides on a rod 52 as a bearing and carries an automatic stop comprising a switch 53. The rod 52 is parallel to the guide rod 40 on which the brush carriage slides. An extension 54 of the brush carriage 21 projects upward into position to operate the switch 53 when the brush carriage 21 moves to the right far enough to bring the extension 54 into the relation with the second carriage shown in Fig. 4.

When the apparatus is used to cause an arc to fade at the end of a weld, the motor 46 is operated in a direction that moves the brush carriage 21 to the left. At some point before the brushes 41 reach the end of the resistance elements 13, 15, the arc will be extinguished and if the welder releases the manual control device, the motor 46 will be automatically reversed (by switches that will be described) and the brush carriage will return to its original position where it is automatically stopped by the switch 53.

If the welder does not release the manual control, the movement of the brush carriage 21 is eventually stopped, before it reaches the end of the guide rod 40, by a limit switch 56. This limit switch 56 could be located in the path of the brush carriage, but it is more convenient to locate it near the right-hand end of the apparatus and operate it with a switch operator 57 secured to the chain 43. The switch operator 57 strikes an operating lever 58 that extends downward from the switch.

The position of the brush carriage 39 during a welding operation, and the open circuit voltage, are dependent upon the position of the second carriage 51 that carries the automatic stop switch 53. In order to shift the carriage 51 lengthwise along its rod 52, means are provided for clutching the second carriage to the brush carriage so that they move as a unit. The circuit for operating the motor under such circumstances must by-pass the automatic stop switch 53, and it is necessary to provide a limit switch 59 in the path of the brush carriage to limit movement of the brush carriage toward the right.

The carriage 51 has a key 60 that slides in a key-way 61 in the rod 52 for preventing angular movement of the carriage 51 around the axis of the rod 52. For clutching the carriage 51 to the brush carriage 21, the rod 52 and carriage 51 are rocked as a unit about the axis of the rod 52, and a notch 62 in the carriage 51 moves down over the upper end of the extension 54 and connects the two carriages 21 and 51 together so that they are moved as a unit by the chain 43.

The means for rocking the rod 52 are best shown in Fig. 5. There is a bell crank 63 keyed to one end of the rod 52. A spring 64, connected to one arm of the bell crank, urges the rod 52 into the position in which the carriages are not connected with one another. The other arm of the bell-crank 63 is connected by a link 65 with a plunger 66 of a solenoid 67. When the solenoid is energized, it rocks the rod 52 clockwise against the tension of the spring 64. A tail on the bell crank 63 moves an operating member of a switch 68 whenever the solenoid 67 rocks the rod 52. The purpose of this switch will be explained in connection with the wiring diagram shown in Fig. 7.

Figure 3:
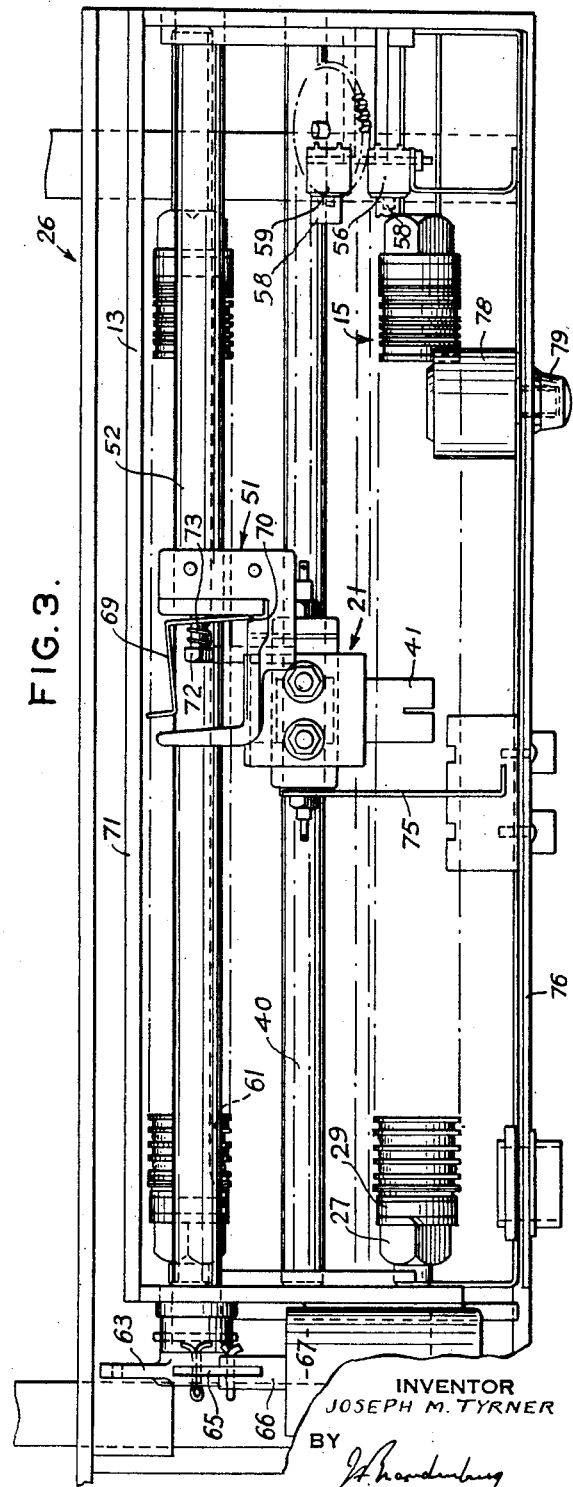
Fig. 3 is a top plan view of apparatus for controlling a welding arc in accordance with this invention.

Referring to Fig. 3, there is a brake for locking the carriage 51 against movement lengthwise of the rod 52 when the carriage 51 is not clutched to the brush carriage 21. The brake comprises a Z section 69 that is slightly flexible and preferably made of steel. The rod 52 extends loosely through the brake 69, and one end of the brake member fits into a recess 70 in the carriage 51. The other end of the brake 69 contacts with a longitudinal member 71 that is parallel to rod 52 and a part of the frame 26. A screw 72 that extends through a slot in the brake 69 threads into the carriage 51, and holds a spring 73 against the brake.

When the rod 52 is in its normal position and the carriage 51 is not connected with the brush carriage 21, the frame member 71 holds the brake 69 in the position shown in Fig. 3. When in this position, the brake 69 is cocked on the rod 52 so that it jams and will not slide. The carriage 51 cannot move lengthwise on the rod 52 without moving the brake 69.

When the rod 52 is rocked to clutch the carriage 51 to the brush carriage 21, the brake 69 is rocked with the carriage 51 away from the frame member 71 so that the spring 73 can push the lower part of the brake against a flat surface of the carriage 51 and into a position substantially at right angles to the axis of the rod 52 so that the brake no longer jams on the rod.

An indicator 75, attached to the brush carriage 21 moves as a unit with the brush carriage and is visible through a window in a control panel 76 at the front of the apparatus. If desired, a scale can be applied to the front panel along the window for use with the indicator 75 in determining the position of the brushes along the length of the resistance elements.

A speed regulator 78 is attached to the front panel 76 and adjusted by a knob 79. This regulator 78 is connected in the motor circuit in such a way that it controls the speed of the motor only when the motor is moving the brush carriage toward the left, the direction that reduces the arc and causes it to fade.

Fig. 7 shows the wiring diagram of the control apparatus illustrated in Figs. 3–6. All of the switches have a bias toward the positions shown in Fig. 7. There are two relays 81, 82 connected in the control circuit. The relay 81 can be energized by depressing a push-button switch 83 and is used when the welder wants to set the apparatus for a lower open circuit voltage. The other relay 82 is energized from a push-button switch 84 when the apparatus is to be adjusted for higher open circuit voltage. The distance that the motor 46 will move the automatic stop that determines the open circuit voltage will depend upon the length of time that the push-button switch 83 or 84 is held closed. Maximum limits of adjustment are determined by the limit switches 56 and 59, as previously explained. When the push button 84 is pressed to energize the solenoid 67 and the relay 82, the circuit of the motor 46 will not be completed through the limit switch 59 until after the switch 68 closes. As explained above, the switch 68 closes whenever the solenoid 67 rocks the rod 52 to release the brake 69. Thus the switch 68 prevents operation of the motor 46 upon pressing the push button 84, until after the brake 69 has been released.

The apparatus is provided with a remote control comprising a housing 86 on the end of a flexible cable 87 that reaches to the location where the welder is at work. The welder can hold the housing in one hand and squeeze it to displace a switch handle 88 that is connected to the housing 86 by a pivot 89. The handle 88 shifts a movable contact 90 between fixed, switch contacts 91 and 92.

The handle 88 is normally held in the position shown in Fig. 7, with the movable contact 90 against the lower switch contact 92, by a light spring 93. When the contacts 90 and 92 are together, the motor 46 moves the brush carriage back to the point where the automatic stop switch 53 breaks the circuit.

When the handle 88 is squeezed in far enough to move the contact 90 against the upper contact 91, the motor 46 moves the brush carriage in the direction to cause the arc to fade. The welder can stop the motor at any time by relaxing his grip on the housing sufficiently to permit the movable contact 90 to move away from the upper contact 91 but not all the way down to the lower contact 92. If the handle 88 is released enough to cause the contact 90 to come against the lower contact 92, the rotation of the motor is reversed and the brush carriage is moved back toward its original position.

In order to make it possible for the welder to tell, by the feel of the handle 88, when the movable contact 90 is in mid-position between the fixed contacts 91, 92, a heavy spring 95 is located in such position that the handle 88 encounters the resistance of the heavy spring 95 when the contact 90 has moved away from the lower contact 92 and before it has been brought against the upper contact 91.

Remote control of the open circuit voltage adjustment is obtained from a switch located in the housing 86 and operated by a rod 97 that projects through both the top and bottom of the housing 86. The rod 97 is held in a middle position by suitable means, such as springs 98, and when in such position holds a movable, switch contact 99 midway between fixed, switch contacts 100 and 101. Displacing the rod 97 downward to bring contact 99 against the lower contact 101 has the same effect as closing the push-button switch 83. Moving the rod 97 upward until the movable contact 99 touches the upper contact 100 has the same effect as operating the push-button switch 84.

Various changes can be made in the circuits, such as proportioning or arranging the resistance in series with the arc, in any desired portion of the system whereby an increase in this resistance and a decrease in the variable resistance in shunt with the arc circuit produces a greater reduction in the electrode voltage than would be accomplished merely by the change in the variable resistance in shunt with the arc circuit. Other changes and modifications can be made, and some features of the invention can be used without others.

I claim:

1. The method of supplying current for arc welding which comprises connecting the work and electrode with a source of welding current, shunting a portion of the current from said source through a circuit in parallel with the arc circuit, and varying the resistance of the arc circuit and the shunt circuit to reduce the current flowing at the arc to a greater extent than would result from the change in the resistance of the shunt circuit alone.

2. The method of controlling an electric welding arc in a system having a resistance connected across a power line which supplies the electricity for the welding arc and a resistance in series with the welding arc, which comprises taking the current for the arc circuit from a point intermediate the ends of the resistance across the power line, and varying both the point of the resistance with which the arc circuit is connected and the resistance in series with the arc circuit itself, to reduce the heat of the arc to a greater extent than would result from the variation of said point alone.

3. The method of controlling the heat of an electric arc that is supplied with power from a constant potential source, which method comprises closing the circuit between the terminals of said source through a constant resistance, supplying power for the arc through a variable resistance in series with the arc and in series with a portion of said constant resistance, and in parallel with another portion of said constant resistance, and increasing said variable resistance and decreasing the amount of said constant resistance that is in parallel with the arc circuit to reduce the heat of the arc.

4. The method of eliminating the arc crater at the end of a weld, which method comprises connecting a resistance across a power line that supplies the current for welding, supplying power for the arc through a rheostat in series with the arc, supplying power for the arc from a point intermediate the ends of the resistance through a circuit that is in series with a portion of said resistance and in parallel with another portion of said resistance, and causing the arc to fade at the end of a weld by increasing the resistance of the rheostat and at the same time changing the point of connection of the arc circuit with said resistance, to increase the proportion in series and decrease the portion of said resistance in parallel with the arc circuit.

5. The method of eliminating an arc crater at the end of a weld bead, which method comprises welding with a resistance element shunted across the arc circuit, and at the end of the weld simultaneously increasing the resistance of the arc circuit and decreasing the resistance of the shunt circuit whereby the arc is caused to fade at a rate greater than would result from the decrease in the resistance of the shunt circuit.

6. An arc welding apparatus including a load circuit, a resistance element in said circuit in series with the arc, a second resistance element in a circuit in parallel with the load circuit, and means for simultaneously increasing the resistance in one of the circuits and decreasing the resistance in the other circuit to control the arc.

7. Arc control apparatus for eliminating the crater at the end of a weld bead, said apparatus including a circuit in series with the arc, a circuit in parallel with the arc, and means for increasing the resistance of the series circuit and decreasing the resistance of the parallel circuit to cause the arc to fade.

8. Apparatus for controlling an electric arc that is supplied with power from a constant potential source, including in combination a resistance element for connection across the supply line from the constant potential power source, and a load circuit connected in parallel with a portion of the resistance element, said load circuit including a rheostat in series with the arc, and a conductor that is movable into different positions to connect different proportions of the resistance element in series and in parallel with the load circuit, and means for varying the position of said conductor and the resistance of the rheostat at the same time.

9. Apparatus for controlling an electric arc that is supplied with power from a supply line, comprising two resistance elements each with a row of contacts extending along and spaced from the row of contacts of the other, means for connecting one of said resistance elements across the supply line, an arc circuit connected in series with the other resistance element, a brush device that touches the contacts of both rows and establishes an electrical connection between the resistance elements, said brush device being movable along the rows of contacts to connect the resistance elements at different points whereby portions of both resistance elements may be connected in series with the arc, and said resistance elements and brush device being connected and arranged so that movement of the brush device in one direction increases the amount of resistance in series with the arc by increasing the portion of each of said resistance elements in series with the arc.

10. An electric welding device including two resistance elements each with a row of contacts extending along and spaced from the row of contacts of the other, a brush device that touches the contacts of both rows and establishes an electrical connection between the resistance elements, said brush device being movable along the rows of contacts to connect the resistance elements at different points, motor-operated means for moving the brush device, a control for reversing the motor-operated means to return the brush device to its original position, an automatic stop for discontinuing the operation of the motor-operated means when the brush device reaches its original position, conductors for connecting the first of the resistance elements across a line from a power source, and an arc circuit connected at one end with the power line and at the other end with a terminal of the second resistance element whereby the brush device connects portions of each of said resistance elements in series with the arc circuit, so that movement of the brush device in one direction from its original position increases the portion of each of said resistance elements in series with the arc circuit.

11. Apparatus for supplying power to a welding arc and for causing the arc to fade and prevent crater formation at the end of a weld bead, said apparatus comprising a first resistance element with terminals for connection across a power line from a source of welding current, a second resistance element located alongside of the first resistance element, each of said resistance elements having a row of contacts along a line parallel to the row of contacts of the other, a guide between the rows of contacts, a brush carriage movable along the guide, a switch carriage also movable along the guide, a motor, motion-transmitting connections from the motor to the brush carriage, a reversing control for changing the direction of movement of the motion-transmitting connections, a switch on the switch carriage for stopping the movement of the motion-transmitting means, an abutment on the brush carriage in position to operate the switch on the switch carriage when the carriages come together, a clutch operable to connect and disconnect the switch carriage and said motion-transmitting means, brushes on the brush carriage in position to travel along the rows of contacts of the respective resistance elements, said brushes being connected to establish a circuit between the resistance elements, and an arc circuit, one side of which is connected to one end of the second resistance element and the other side of which is connected with the power line, whereby the brushes connect portions of each of said resistance elements in series with the arc circuit, so that movement of the brush carriage in one direction from its original position increases the portion of each of said resistance elements in series with the arc circuit.

JOSEPH M. TYRNER.